(No Model.) 2 Sheets—Sheet 1.
C. H. KAHLER.
CASH INDICATOR AND REGISTER.
No. 409,206. Patented Aug. 20, 1889.
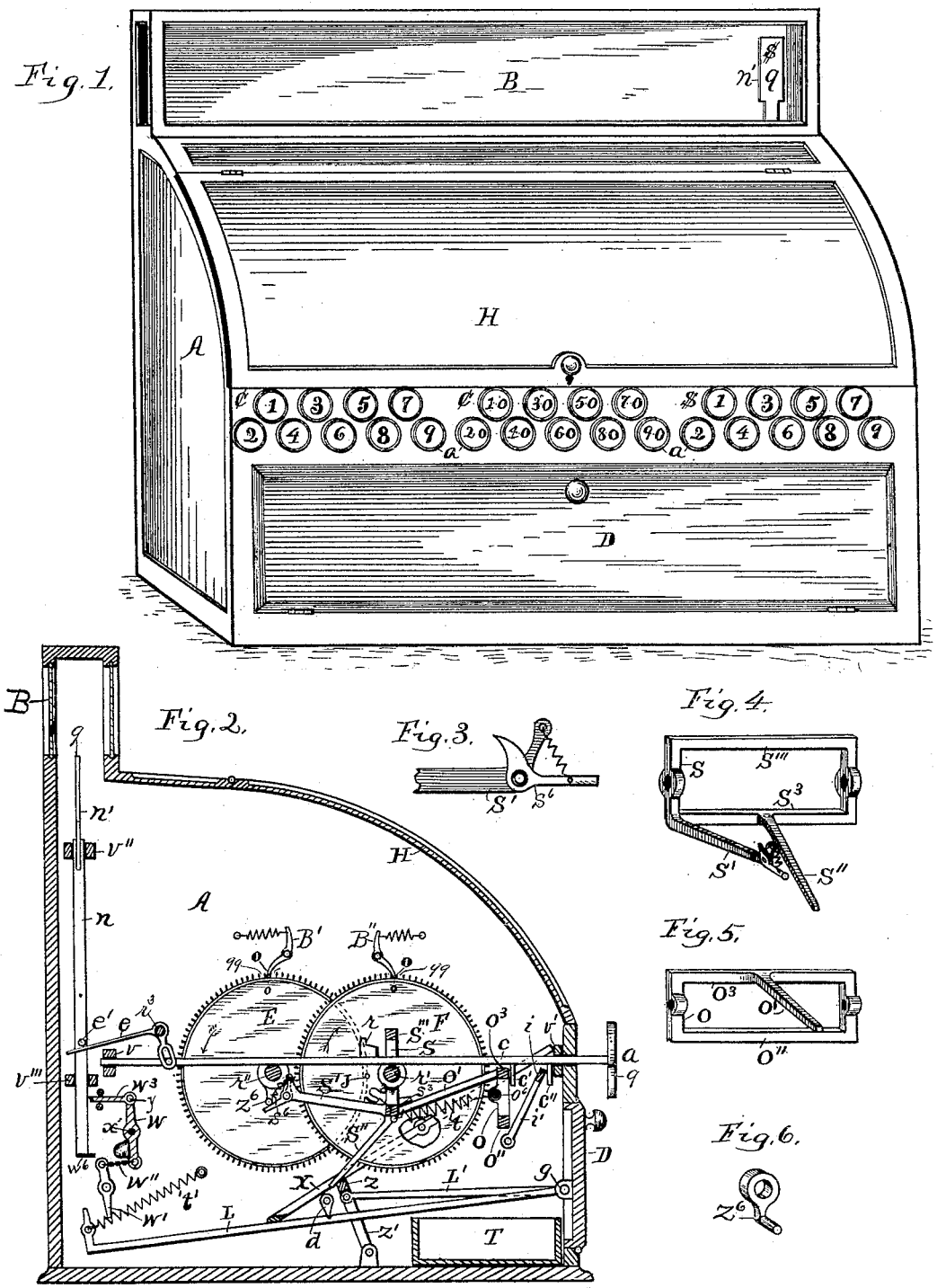
Witnesses.
K. C. Hutchins
D. P. Lennon
Inventor.
Clarence H. Kahler
By Thos. H. Hutchins Atty.

(No Model.) 2 Sheets—Sheet 2.
C. H. KAHLER.
CASH INDICATOR AND REGISTER.
No. 409,206. Patented Aug. 20, 1889.
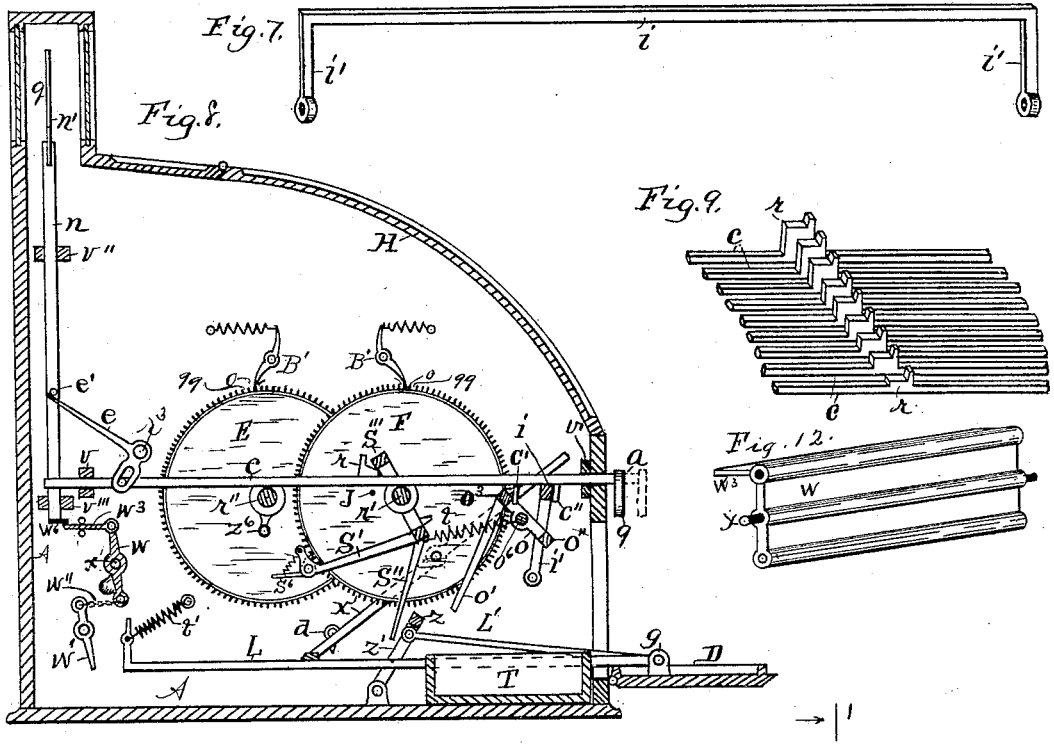
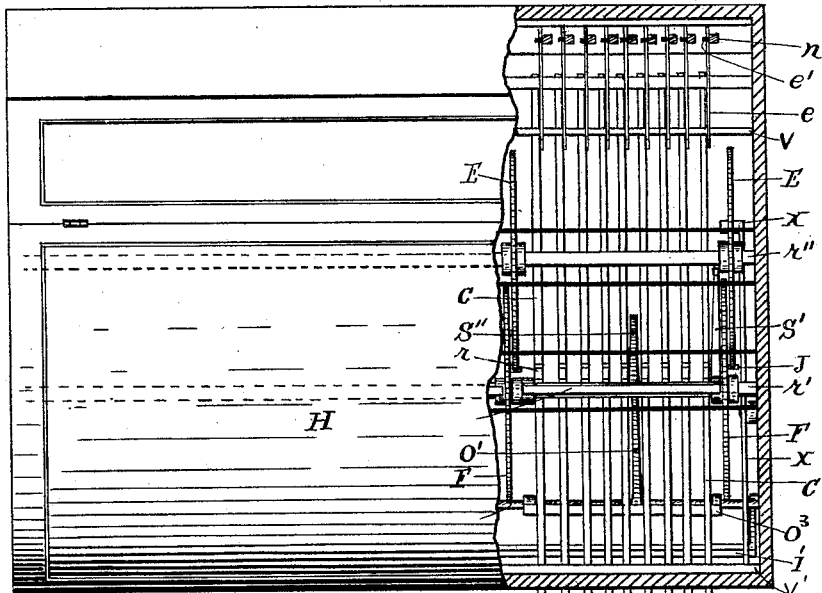
Witnesses,
H. C. Hutchins
D. P. Lennon
Inventor.
Clarence H. Kahler.
By Thos. H. Hutchins Atty.

UNITED STATES PATENT OFFICE.

CLARENCE H. KAHLER, OF WILMINGTON, ILLINOIS.

CASH INDICATOR AND REGISTER.

SPECIFICATION forming part of Letters Patent No. 409,206, dated August 20, 1889.

Application filed August 27, 1888. Serial No. 283,849. (No model.)

*To all whom it may concern:*

Be it known that I, CLARENCE H. KAHLER, a citizen of the United States of America, residing at Wilmington, in the county of Will and State of Illinois, have invented certain new and useful Improvements in Cash-Registers, of which the following is a specification, reference being had therein to the accompanying drawings and the letters and figures of reference thereon, forming a part of this specification, in which—

Figure 1 is a perspective view of the cash-register as it would appear ready for use, showing three banks of push-keys numbered to represent dollars and cents. Fig. 2 is a vertical cross-sectional view on line 1 of Fig. 10 looking in the direction of the arrow, showing one key-slide and the parts operated by it. Figs. 3, 4, 5, 6, 7, 9, 11, and 12 are detail perspective views of parts shown in Figs. 2, 8, and 10, to clearly show their form. Fig. 8 is a similar view to that shown in Fig. 2, showing the push-key pushed in and showing the reverse movement of the parts operated by it. Fig. 9 is a perspective view of one series of the keys, showing their graduated series of rests, and Fig. 10 is a top plan view showing a part of the outer case removed to show the parts of a single section of the device.

Referring to the drawings, A represents the outer case of the device, having the doors H and D, and the extension-top provided with glass sides B for exposing the tablets to view from either side of the case. As each key-slide operates in precisely the same manner and upon similar parts, a description of the construction and operation of one will be sufficient for all. The key-slides are arranged as shown in Fig. 1, in three separate sections or groups, the one at the right representing dollars from one to nine, both inclusive, the center series representing cents from ten to ninety, both inclusive, and the left-hand series representing cents from one to nine, both inclusive.

Looking at Figs. 2, 8, and 10, the description will apply to the key-slide representing nine dollars in the right-hand section and the parts it operates. The mechanism of each section is precisely like the other section, except the key-slides are numbered to represent different denominations.

$c$ is a reciprocating key-slide having a numbered push-button $a$ on its outer exposed end, and is supported properly in and across the case A, immediately below the door H, by means of the longitudinally-arranged cross-bars $v$ at its rear end and cross-bars $v'$ at its forward end.

$n$ is a tablet-rod having the tablet $n'$ secured at its upper end numbered the same as the push-button $a$ of slide $c$, and held in place by means of the longitudinal cross-bars $v''$ $v'''$, and connected with slide $c$, by means of a bell-crank $e$, in such manner that said tablet-rod will be moved upward when said slide is pushed in.

$r'$ and $r''$ are shafts longitudinally arranged across the case A, and E and F are registering-dials respectively loosely arranged on said shafts, and each having their peripheries divided into notches numbered from 0 to 99, both inclusive, the wheel F having a pin J on its side arranged to engage a notch in wheel F and rotate said wheel one notch at each revolution of wheel F. Said slide $c$ has arranged on its lower side the depending pins $c'$ and $c''$, the pin $c'$ being for the purpose of engaging the oscillating cross-bar $i$, and the pin $c''$ being for the purpose of simultaneously engaging the upper bar $o^3$ of frame $o$ and moving them forward when said slide is pushed in.

S is a rectangular frame boxed on shaft $r'$ and designed to oscillate thereon. The lower bar $S^3$ of said frame S is provided with two extending arms $S'$ and $S''$ (see Fig. 4,) the arm $S'$ being provided on its outer end with a spring-dog $S^6$ for engaging the peripheral notches of dial F, and the arm $S''$ for engaging the rear side of cross-bar Z.

When the frame S oscillates from its normal position shown in Fig. 2 to that shown in Fig. 8, the upper cross-bar $S'''$ is arrested by the rest $r$ on the upper side of the slide $c$, causing the dog $S^6$ on the outer end of arm $S'$ to traverse or move over the number of notches on the periphery of dial F permitted by the height of said rest. A coil-spring $t$ connects the lower part of said frame S with cross-shaft $O^6$, and is for the purpose of assisting to oscillate frame S to render its oscillation certain. When said frame S returns to its normal position, (shown in Fig.

2,) the dog $S^6$, being engaged with a notch on the periphery of dial F, causes said dial to be rotated with said frame, causing dog B″, which engages the notches of dial F at its upper side, to traverse the number of notches on said dial corresponding with the number of the push-key pushed in, when dog $S^6$ engages arm $T^6$, secured on shaft $r''$ and releases it from further contact with said dial, the number of notches that have passed by dog B″ being determined by the height of rest $r$ on the slide $c$.

O is a rectangular frame boxed on cross-shaft $O^6$ in such manner that it can oscillate thereon. The upper bar $o^3$ of said frame is provided with a rearwardly-extending arm $o'$, (see Fig. 5,) the extending end of which arm is intended to engage the front side of bar $S^3$ of frame S to retain said frame in its normal position. (Shown in Fig. 2.) Said frame O is boxed at its rear side on shaft $O^6$, so as to throw its weight on the forward side of said shaft to overbalance arm $O'$ and hold it in the position shown in Fig. 2, and so the upper bar $o^3$ of frame O will constantly engage depending pin $c'$ of slide $c$, by which pin said frame is oscillated.

$i$ is a cross-bar having depending arms $i'$ at each end, the lower ends of which arms are respectively pivoted to the inner sides of the case (see Fig. 7) in such manner that said cross-bar may rest continuously against the depending pin $c''$ of slide $c$ and be oscillated by said slide as it reciprocates.

$x$ is a lever pivotally secured at about its center to the inner end of the case A, the upper end of which lever rests on cross-bar $i$, and its lower end, which is bent to one side, resting on the bar L. Said bar L has its forward end pivotally secured to the inner side of the door D, and its rear end is held and supported by the coil-spring $t'$. Said bar L has a notch on its upper side about at its center for receiving the permanent fulcrum-catch $d$, secured to the inner end of the case. When said bar L is in its normal position, as shown in Fig. 2, said bar holds door D closed and locked by means of its engagement with said catch, and is held in contact with said catch by means of said coil-spring $t'$. When said bar L is released from said catch by means of pressure from lever $x'$, the spring $t'$ will move said bar L forward and open door D, as shown in Fig. 8.

Z is a cross-bar having depending arms Z′ at each end, (see Fig. 11,) pivotally secured at their lower ends to the floor of the case. Said cross-bar Z is connected with the door D by means of the link L′, so that when said door is opened and closed it will oscillate said cross-bar. Said cross-bar is for the purpose of engaging the lower side of arm S″ of frame S (see Figs. 2, 4, and 8) to oscillate said frame S back from the position shown in Fig. 8 to that shown in Fig. 2, and for holding it in such position so long as door D is closed.

W is a rectangular frame boxed on the cross-shaft $x$, and is hinged at its upper side to the rear edge of the horizontal plate $W^3$, held in a horizontal position by passing between guides arranged in the ends of the case, as shown. The lower side of said frame is connected by means of a short chain W″ to the dog W′, which is pivoted at about its center to the ends of the case. The lower part of lever W is weighted so as to cause it to stand normally in a vertical position, as shown. The lower end of the tablet-rod $n$ is provided with a detent $W^6$, preferably made of rubber, arranged to project at one side toward plate $W^3$ and rest upon its outer edge, when the tablet-rod is moved to be above it by the bell-crank and slide. Said plate $W^3$ retains the tablet-rod in its elevated position, as shown in Fig. 8, after the slide $c$ has reciprocated forward and caused the bell-crank to return, until rod L, attached to door D, moves forward from the position shown in Fig. 2 to that shown in Fig. 8, when its rear bent end will engage the lower end of dog W′ and cause it, through the medium of frame W, to withdraw plate $W^3$ from contact with said tablet-rod and let it drop to its first position. (Shown in Fig. 2.)

B′ and B″ are spring-dogs pivoted to some adjacent object above dials E and F, so as to engage with their peripheral notches and prevent their backward rotation, which dogs also operate to indicate the amount of cash that should be in the till T by the number of the notch it is on inspection found to rest in at the close of the day.

T is the money-till within the case and accessible only through door D.

In operation, when the slide $c$ is pushed in by means of pressure on its push-button $a$ its depending pins $c'$ $c''$ will simultaneously engage the upper bar $o^3$ of frame $o$ and cross-bar $i$ and move them rearward, and at the same time move the bell-crank $e$ to elevate the tablet-rod $n$ to expose its tablet $n'$ to view. Pressure on bar $i$ raises the upper end of lever X, causing it to bear down on rod L and release it from catch $d$, when spring $t'$ will move rod L forward, causing it to open door D and trip the dog W′ to drop any tablet-rod that had previously been elevated and resting on plate $W^3$. This gives access to the till T and also moves bar Z, connected with door D, forward to relieve it from contact with arm S″ of frame S. Said frame can oscillate on shaft $r'$ after its lower bar $S^3$ has been relieved from contact with arm O′ on account of frame $o$ having been oscillated by the slide $c$ through the medium of pin $c'$, so that all the parts are changed from the positions shown in Fig. 2 to that shown in Fig. 8. In the instance shown the slide numbered 9 has been pushed in and has elevated the tablet-rod having a corresponding number indicating that nine dollars had been received and placed in the till, after which the door D is closed, which causes cross-bar Z to engage arm S″, and oscillate frame S back to its original position, causing dial F to be rotated in the direction of the arrow nine notches. The rest $r$ on the slide is of the proper height to arrest bar S''' in its rearward oscillation when dog $S^6$ has moved over nine notches, and when said frame S is oscillated to its original position, as stated, dog $S^6$ will rotate dial F forward and cause it to rotate nine notches.

$Z^6$ is a pin fixed on shaft $r''$ to arrest dog $S^6$ in its upward movement, and disengage it from dial F at the proper time to prevent its rotating dial F too far. Each slide $c$ in a series is provided with a rest of a different height from the others, which determines the degree of oscillation of frame S and regulates the number of notches the dials are to be rotated.

Fig. 9 shows a series or row of key-slides of one section of the machine, each slide bearing a rest $r$ of a different height from the others and arranged in a graduated series of the proper height to arrest bar S''' at the proper time, so dial F will only be rotated the number of notches corresponding with the number of the key-slide by which it was operated.

A series of key-slides and their rests $r$ are shown in their normal position in Figs. 2 and 9, in which position said rests all stand in line with each other. When any one of the series of key-slides is moved rearward to the position shown in Fig. 8, its rest is necessarily moved beyond and out of line with the others in the series. When a key-slide is so moved rearward, the frame S then oscillates so its upper bar S''' will be arrested by the rest $r$ of the key-slide moved rearward, as shown in Fig. 8, passing over the rests not moved and not being in contact with any of those not moved; hence the rotation of frame S is governed by the height of the rest $r$ its bar S''' may engage, and not on the degree of reciprocation of the key-slides, as they are all intended to reciprocate the same distance.

Only one slide in a section can be used in one operation—as, for example, if four dollars and twenty-nine cents were to be placed in the till the following slides would be pushed in, viz: 4 in the right-hand section, 20 in the center section, and 9 in the left-hand section. Supposing the dials E F of each section were set so said dogs B' B'' were respectively in notch 0 or zero of the dial, the dial F in the right-hand section would be moved four notches, indicating four dollars, the dial F in the center section would be moved two notches, and the dial F in the left-hand section would be moved nine notches. The amount of cash put in the said till would be indicated by the numbers of the notches in which the dogs B' B'' of their dials were found to rest, the aggregate of the numbers of said notches corresponding with the amount put in the till.

The dial F is provided with a pin J on its side, which pin will engage a notch on dial E and rotate said dial one notch forward each time dial F rotates once around. The notches on wheel E represent hundreds—that is, notch 1 represents one hundred, notch 2 two hundred, &c.—so that in reading the dials, if dial F stood so dog B'' was in notch 9, and dial E stood so dog B' was in notch 5, the dials would indicate five hundred and nine dollars had been placed in the till, or should be there. The dials in each section are of course read in the same manner.

At the close of the day the aggregate of the numbers of the notches of all the dials of the three sections when read, as stated, will correspond with the total amount of cash in or what should be in the till. If higher or different numbers are desired to be indicated, other sections can be added to the machine, such as a section representing one hundred dollars to nine hundred dollars, &c.

Having thus described my invention, what I claim as new, and desire to secure by Letters Patent, is as follows:

1. In a cash-register, the combination of the series of numbered key-slides having a graduated series of rests $r$, the series of tablet-rods having numbered tablets to correspond with the numbers of the key-slides, the dial-wheels E and F, having numbered peripheral notches, the oscillating frame S, having the cross-bar S''', and the mechanism described for rotating said dials, substantially as and for the purpose set forth.

2. In the cash-register shown and described, the combination of the dials E and F, having numbered peripheral notches, the oscillating frame S, the dial E being arranged to be rotated by dial F one notch to each revolution of dial F, a series of numbered key-slides for rotating said dials, and having rests or stops $r$ for controlling the rotation of said dials, so as to cause them to rotate the sufficient number of notches to register the aggregate of the denominational numbers of the key-slides, and the mechanism, substantially as shown, for connecting said slides and dials, substantially as and for the purpose set forth.

3. In the cash-register shown and described, in combination with the dials E and F, having numbered peripheral notches, the door D, and the mechanism for connecting said dials and door, substantially as specified, whereby the dials are rotated when said door is closed, the number of notches corresponding with the number of the key slide or slides by which said door was opened, substantially as and for the purpose set forth.

CLARENCE H. KAHLER.

Witnesses:
 THOS. H. HUTCHINS,
 K. C. HUTCHINS.